United States Patent [19]

Ebbs

[11] Patent Number: 4,484,114
[45] Date of Patent: Nov. 20, 1984

[54] SELF-STARTING BRUSHLESS DC MOTOR
[75] Inventor: John W. Ebbs, Woodstock, N.Y.
[73] Assignee: Rotron, Incorporated, Woodstock, N.Y.
[21] Appl. No.: 354,747
[22] Filed: Mar. 4, 1982
[51] Int. Cl.³ .................................. H02P 1/18
[52] U.S. Cl. .................................. 318/138; 318/254; 310/184
[58] Field of Search ............. 318/254, 138, 439, 391, 318/396, 254 A, 431, 408; 310/180, 184, 68 R, 68 A, 68 B, 68 C, 68 D, 68 E, 156

[56] References Cited
U.S. PATENT DOCUMENTS

| | | |
|---|---|---|
| 3,299,335 | 1/1967 | Wessels . |
| 3,394,296 | 7/1968 | Dotto . |
| 3,433,987 | 3/1969 | Thees . |
| 3,461,365 | 8/1969 | Newland et al. . |
| 3,486,098 | 12/1969 | Bullinger et al. . |
| 3,493,831 | 2/1970 | Roberts . |
| 3,569,753 | 3/1971 | Babikyan ............... 310/68 |
| 3,611,081 | 10/1971 | Watson . |
| 3,644,809 | 2/1972 | Lahde . |
| 3,696,277 | 10/1972 | Liska et al. . |
| 3,739,248 | 6/1973 | Wehde . |
| 3,775,648 | 11/1973 | Brown et al. . |
| 3,860,843 | 1/1975 | Kawasaki et al. . |
| 3,881,142 | 4/1975 | Endo ..................... 318/254 A |
| 3,930,190 | 12/1975 | Liska ..................... 318/254 A |
| 4,051,420 | 9/1977 | Tanikoshi ............... 318/254 A |
| 4,075,521 | 2/1978 | Nordebo ................... 310/184 |
| 4,114,073 | 9/1978 | Uzuka . |
| 4,357,563 | 11/1982 | Ohno ..................... 318/254 |
| 4,403,177 | 9/1983 | Welek ..................... 318/254 |

Primary Examiner—Stanley J. Witkowski
Assistant Examiner—Patrick Keane
Attorney, Agent, or Firm—Brumbaugh, Graves, Donohue & Raymond

[57] ABSTRACT

A self-starting DC motor includes first and second main windings and a rotor. A starting winding is angularly offset from the first and second main windings for aligning the rotor offset from the main windings to start the motor from a noncogged position. A timing device is employed to energize the angularly offset windings when the motor is first turned on. After a time sufficient for the rotor to come to rest in its starting position, the starting winding is deenergized. A position sensing device generates signals indicative of the position of the rotor. A switch is responsive to the position indicating signals and alternately energizes the first and second main windings to operate the motor.

11 Claims, 4 Drawing Figures

SELF-STARTING BRUSHLESS DC MOTOR

CROSS-REFERENCE TO RELATED APPLICATIONS

Reference is made to copending application Ser. No. 150,202 filed May 15, 1980, also assigned to the assignee of this application.

BACKGROUND OF THE INVENTION

This invention relates to DC motors, and more particularly, to low cost, self-starting brushless DC motors.

In a DC permanent magnet motor, the initial position of the rotor with respect to the stator is important when the windings are energized to start the rotation of the motor. If the rotor position is such that, when the stator windings are first energized, unlike poles of the permanent magnet rotor and the wound stator are aligned, or very nearly aligned, insufficient torque will be developed to cause the rotor to turn to the next angular position where stator winding energization is advanced. The rotor is thus unable to turn from this locked or "cogged" position, or if the rotor rests near this position very slow starting is the result.

Various means have been proposed to overcome the problem of initially positioning the rotor and stator in an electric motor so that the rotor does not become locked. A common technique used for low cost brushless DC motors in sizes of 10 millihorsepower and less uses a reluctance effect of initially positioning the permanent magnetic rotor for proper starting. Modified stator pole shapes have been used to this end. This technique has been observed to be limited due to very small starting torques resulting. An additional disadvantage of this reluctance offset system is that it creates a negative running torque and therefore tends to derate the operating performance of the motor.

Another means to prevent cogging has been to position a permanent magnet within the stator and offset from the main windings of the motor. When the motor is turned off, the permanent magnet causes the rotor to align in a position offset from the main stator pole. When the motor is energized, the offset between the rotor and the stator pole enables starting rotation. However, this detracts from the operation of the motor because its magnetic effects are present while the motor is running, and are not synchronized with the energization of the main windings.

A need thus exists for a self-starting brushless DC motor in which the rotor and stator cannot lock on starting, and in which the starting provisions do not detract from normal motor operation.

SUMMARY OF THE INVENTION

According to the present invention, on the stator core of a brushless DC motor, a starting winding is spatially offset from the main windings. When the motor is switched on, a timing circuit energizes the starting winding prior to the main winding to establish one secondary stator magnetic field, offset from the field from the main poles. The offset secondary magnetic field positions the rotor in the desired location and, after a small increment of time, the correct main winding is energized to start normal motor operation. Consequently, starting is assured. The starting winding is switched out electronically after the initial rotor position has been established and remains deenergized during running of the motor so that there are no adverse effects on running torque.

In one embodiment of the present invention, a self-starting brushless DC motor includes first and second main windings, a rotor, and a starting winding angularly offset on the stator periphery from the first and second main windings. The starting winding aligns the rotor offset from the main windings prior to starting the motor. A monostable multivibrator initially energizes the starting winding only when the motor is first energized. After a preselected time has elapsed, the monostable multivibrator disconnects the starting winding and enables a switching circuit. A position sensing means, such as a Hall effect magnetic sensor or an optical sensing device, is provided to generate a signal indicative of the position of the rotor by sensing the location of, for example, either permanent magnets forming the rotor or one or more commutation magnets especially provided to indicate rotor position. The switching circuit, under the control of the sensing means, alternately energizes the first and second main windings to operate the motor.

BRIEF DESCRIPTION OF THE DRAWINGS

For a more complete understanding of the present invention, reference is made to the following detailed description taken in conjunction with the accompanying drawings in which.

DETAILED DESCRIPTION

Figure 1:
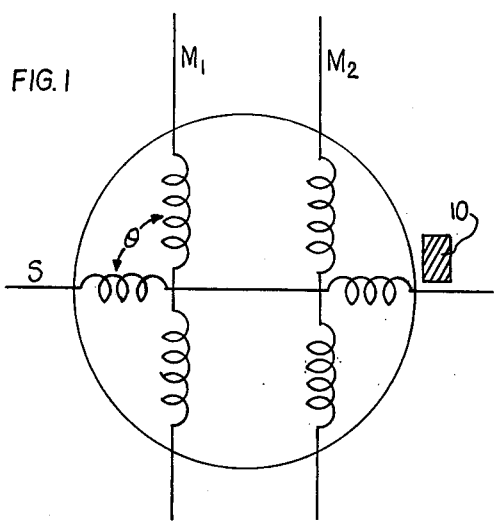
FIG. 1 is a diagrammatic representation of a two-pole motor with main windings aligned in one direction and starting windings angularly offset from the main windings.

In FIG. 1, a winding array for a two-pole DC motor includes a start winding S and main windings $M_1$ and $M_2$. The start winding S is angularly offset by an angle theta ($\theta$) from the main windings $M_1$ and $M_2$. The angle theta is, in FIG. 1, 90 physical degrees. A position sensor 10, such as a Hall effect device or an optical sensing device, is positioned proximate the rotor to sense the position of the rotor as it turns. Conventionally the position sensor 10 eliminates the commutator brushes in a DC motor. The sensor 10 can be controlled by commutation magnets provided in addition to the rotor magnets or a pair of angularly spaced Hall sensors may be employed to extend the arc through which the rotor magnets can effect energization of the stator windings as in U.S. Pat. No. 4,365,187, of McDaniel, Brown, and Thompson, issued on Dec. 21, 1982.

Figure 4:
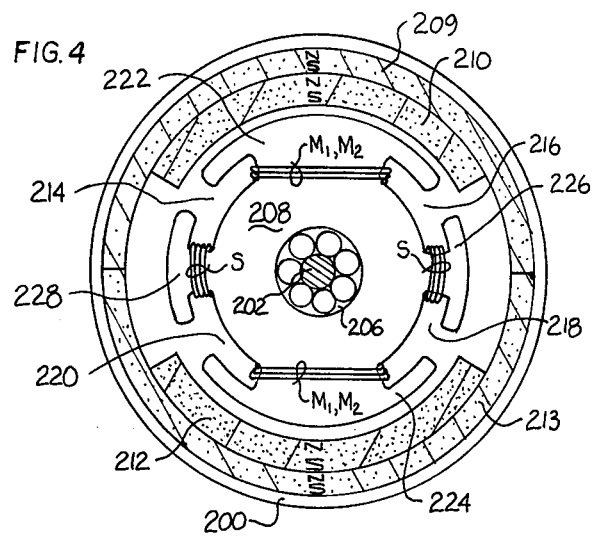
FIG. 4 is a diagrammatic cross-sectional view through the rotor and stator of a motor showing the main and starting windings according to the present invention.

In FIG. 4, a rotor 200 is rotatably mounted by a shaft 202 and bearings 206 on a stator 208, which is generally schematically illustrated and may comprise any of several well known permanent magnet arrangements. In the illustrated embodiment, a permanent magnet 210 has a south pole facing the stator 208 and a north pole facing outwardly. A second, diametrically opposite, permanent magnet 212 has a north pole facing the stator 208 and a south pole facing outwardly. The rotor carries commutation magnets 209 and 213 that are detected by the Hall effect device 10 (not shown in FIG. 4) as the rotor rotates. The rotor 200 includes slots 214, 216, 218, and 220. A bifilar winding is wound between the slots 214 and 216 and the slots 218 and 220 to provide the main windings $M_1$ and $M_2$ of the stator. The slots 216 and 218 and the slots 214 and 220 are wound to provide the starting winding S.

Stator poles 222, 224 correspond with the windings $M_1$, $M_2$ while stator poles 226, 228 correspond with the starting winding S. Because the stator poles 222, 224 are of greater size than the stator poles 226, 228, the rotor position of least reluctance is generally with the permanent magnets 210, 212 aligned with the stator poles 222, 224. This is the cogged position. The rotor is attracted to and is likely to take this position at rest, with the stator coils deenergized. The starting winding S, then, is offset from the permanent magnets 210, 212 when the motor is at rest in the cogged position. Consequently, by energizing the start winding for a short time before energizing the main windings, motor starting is assured.

Figure 2:
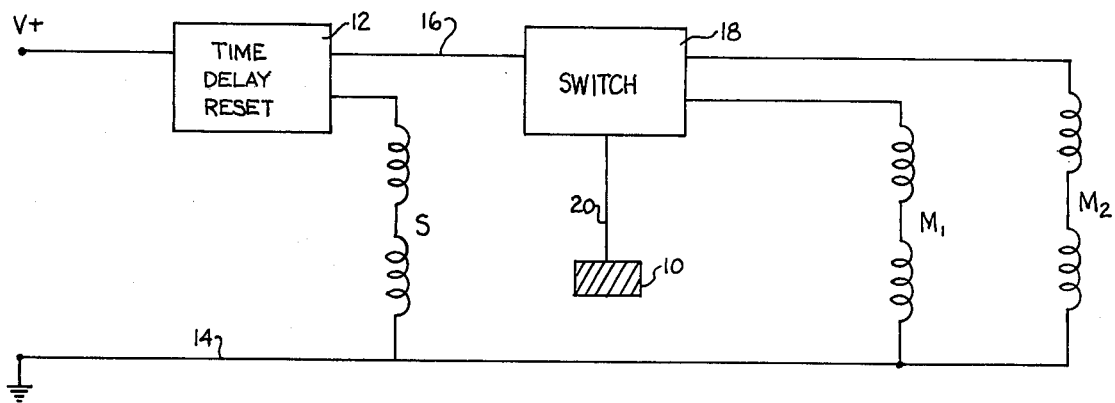
FIG. 2 is a diagrammatic, block diagram representation of a circuit for a self-starting brushless DC motor of the kind illustrated in FIG. 1.

In FIG. 2, the starting winding S is connected between one output of a time delay reset circuit 12 and minus or ground line 14. The circuit 12 can include a monostable multivibrator, commonly known as a "one shot". A lead 16 from another output of the time delay reset circuit 12 leads to one input of a switch circuit 18. The position sensor 10 is physically located to detect the position of the rotor and is connected to the control switch 18 over a line 20. The main windings $M_1$ and $M_2$ are connected between alternate outputs of the switch 18 and the minus or ground line 14.

At start up, the time delay reset circuit 12 initially energizes the start windings S and not the lead 16 to the switch 18. The rotor is caused to turn and come to rest with the secondary stator poles 226, 228 aligned with the starting winding S, assuming that it had not come to rest there. After a small increment of time, the circuit 12 deenergizes the starting winding S and energizes the switch 18 via the lead 16. Under the control of the Hall sensor 10, the switch 18 energizes the correct main winding $M_1$ or $M_2$, the rotor will accelerate toward the main poles of the stator to establish rotation. Thereafter, the switch 18 switches DC current to either $M_1$ or $M_2$ depending on the position of the rotor as detected by the Hall sensor 10, which is sensitive to the presence or absence of a unidirectional magnetic field. Under the control of the Hall device, the switch 18 alternately energizes the main windings $M_1$ and $M_2$ to continue operation once the motor has begun to rotate.

Figure 3:
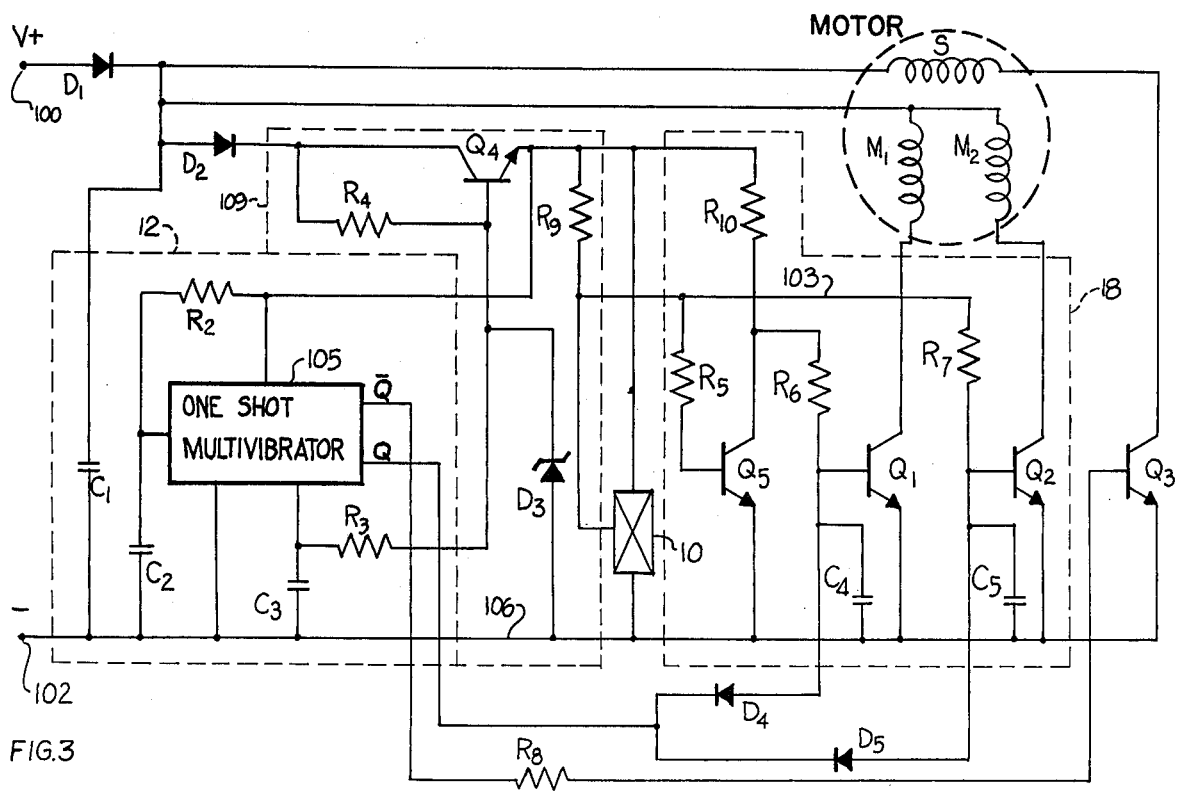
FIG. 3 is a schematic diagram showing a circuit like that of FIG. 2 in greater detail.

FIG. 3 illustrates an exemplary motor control circuit in greater detail. DC power to a pair of input terminals 100 and 102 supplies the start coil S, the main coils $M_1$ and $M_2$ and the circuitry. A diode $D_1$ connects the positive input terminal 100 to the coils and the circuit.

Initially, an R-C circuit, $R_2$-$C_2$, sets a one shot multivibrator 105 so that its output $\overline{Q}$ is high (positive) and its output Q is low (minus or gnd.). Thus, a transistor $Q_3$, whose base is connected to the multivibrator $\overline{Q}$ through a resistor $R_8$, conducts sending current through winding S, the starting winding. The winding S causes the permanent magnet rotor to assume a stationary starting position out of alignment with the main stator poles. At the same instant, diodes $D_4$ and $D_5$, connected to the low multivibrator output Q, hold transistors $Q_1$ and $Q_2$ in off condition. After a predetermined period, the $R_3$-$C_3$ time delay allows the "one shot" to switch states changing $\overline{Q}$ to low and Q to high. At that time the transistor $Q_3$ stops conducting, disconnecting the start winding S. Transistors $Q_1$ and $Q_2$ begin to operate in "run" mode under control of the Hall effect sensor 10.

When $\overline{Q}$ and Q change states, $Q_3$ is deprived of base drive and the start winding S is deenergized. The voltage at the cathodes of $D_4$ and $D_5$ is raised so that these no longer forbid conduction by the transistors $Q_1$ and $Q_2$. If the magnetic field caused by the rotor or a commutation magnet is causing the Hall sensor, which in this embodiment is a Hall switch, to conduct from the line 103 to the negative or ground conductor 106, $Q_2$ will not conduct. Likewise, $Q_5$ will not conduct. Base drive to $Q_1$ via $R_6$ will cause $Q_1$ to conduct and energize $M_1$. Then, when the next commutation magnet changes the direction of the field at the Hall sensor, the sensor will cease to conduct, raising the voltage at the line 103, biasing $Q_2$ into conduction and causing $Q_5$ to clamp the base of $Q_1$ low or at ground. This switches off $Q_1$-$M_1$. Conduction of $Q_2$ and $M_2$ causes the rotor magnets to be pulled toward the second position. This sequence of alternate energization of $M_1$ and $M_2$ continues. As a result, rotation is sustained.

Power interruption will not reset starting sequence until capacitor $C_1$ is sufficiently discharged. The capacitance of $C_1$ will determine line interruption transient allowable before a restart is initiated by the "one shot".

A circuit 109 for voltage regulation consists of $D_3$, $Q_4$, $R_4$. This provides reference voltage for all R-C timer and signal level circuits. Reverse polarity protection is provided by diodes $D_1$ and $D_2$. Operation of the regulator 109 as well as the switching circuit 18 is as described in the above-mentioned U.S. Pat. No. 4,365,187, which is incorporated herein by reference. The Hall sensor 10 can be a Sprague Electric Co. UGN-3013T, as indicated in that application. This device acts to conduct when subject to a magnetic field of the proper orientation and so is suitable for conducting when one rotor magnet is proximate and not conducting when the other magnet is near.

From the above it will be seen that the motor starting provisions of this invention assure location of the rotor to a noncogged position each time the motor starts. However, unlike the provision of an additional permanent magnet to attract the rotor away from its cogged, at rest, position, the features of this invention do not detract from the operation of the motor when the main windings are energized.

While one embodiment of the present invention has been shown in the drawings and described in detail herein, various further modifications may be made without departing from the spirit and scope of the invention.

I claim:
1. A self-starting DC motor comprising:
  main windings wound on a startor for magnetizing main stator poles;
  a rotor cooperating with said stator, and having at least one cogged position at rest;
  a starting winding wound on said stator, and angularly offset from said main windings, for establishing one secondary stator field, whereby said rotor moves away from said cogged position;
  timing means for energizing said starting winding prior to energization of said main windings and deenergizing said starting winding and energizing said main windings after said rotor has been positioned away from said cogged position; and means for sensing the position of said rotor and sequentially energizing said main windings for continuous operation of the motor.

2. The motor of claim 1 wherein said sensing means is responsive to changes in magnetic fields.

3. The motor of claim 1 wherein said starting windings is offset 90 degrees spatially from said main windings.

4. A self-starting DC motor comprising:
main windings on a stator for magnetizing stator poles;
a rotor cooperating with said stator and having at least one cogged position at rest;
a starting winding offset from said main windings on said stator for establishing at least one secondary stator field for moving said rotor to a start position; and
timing circuit means for energizing said starting winding prior to energization of said main windings and for deenergizing said starting winding and energizing said main windings when said rotor has been positioned at said start position.

5. The motor of claim 1 wherein said timing means comprises a monostable multivibrator.

6. The motor of claim 5 wherein the monostable multivibrator has one stable output connected to effect energization of the main windings and a timed astable output connected to effect energization of the starting winding.

7. The motor of claim 6 wherein one output of the multivibrator is connected with means responsive to said timed astable output to energize the starting winding and another output of the multivibrator being connected to switch means responsive to said stable output to energize said main windings.

8. The motor of claim 6 wherein each main winding is electrically connected to a transistor and wherein the stable output of the monostable multivibrator is electrically connected to the transistors to block current flow through the main windings prior to energization of the main windings.

9. The motor of claim 4 wherein the motor is a brushless DC motor having permanent magnets arranged on the rotor, the cogged position of the rotor is a position of reduced reluctance aligned with main stator poles to which the rotor is attracted when the main and starting windings are not energized, and said starting winding is wound onto secondary stator poles, the secondary stator poles being angularly offset from the main stator poles.

10. The motor of claim 4 wherein the timing circuit means includes an R-C time delay means for preventing energizing of the starting winding upon transient interruptions of the energization of the motor and circuit of insufficient duration for the rotor to come to rest.

11. A self-starting motor having a first member, and a second member, the first and second members being relatively rotatable, the first and second members having at least one cogged position at rest, main windings wound on the first member for magnetizing main poles thereon, a starting winding wound on the first member, the starting winding being angularly offset from the main windings, for establishing at least one secondary field for causing relative movement between the first and second members away from the cogged position, and timing means initially to energize the starting winding to position the first and second members initially at a start position prior to energization of the main windings and for deenergizing said starting winding and energizing said main windings when said first and second members have been positioned away from the cogged position.

* * * * *

UNITED STATES PATENT AND TRADEMARK OFFICE
CERTIFICATE OF CORRECTION

PATENT NO. : 4,484,114
DATED : November 20, 1984
INVENTOR(S) : John W. Ebbs

It is certified that error appears in the above-identified patent and that said Letters Patent is hereby corrected as shown below:

Item [56]:

In the second column on the first (cover) page, in the references cited, "Welek" should read --Weber et al.--.

Col. 5, line 23, "Claim 1" should read --claim 4--.

Signed and Sealed this

Fourteenth Day of May 1985

[SEAL]

Attest:

DONALD J. QUIGG

Attesting Officer    Acting Commissioner of Patents and Trademarks